Figure 1:
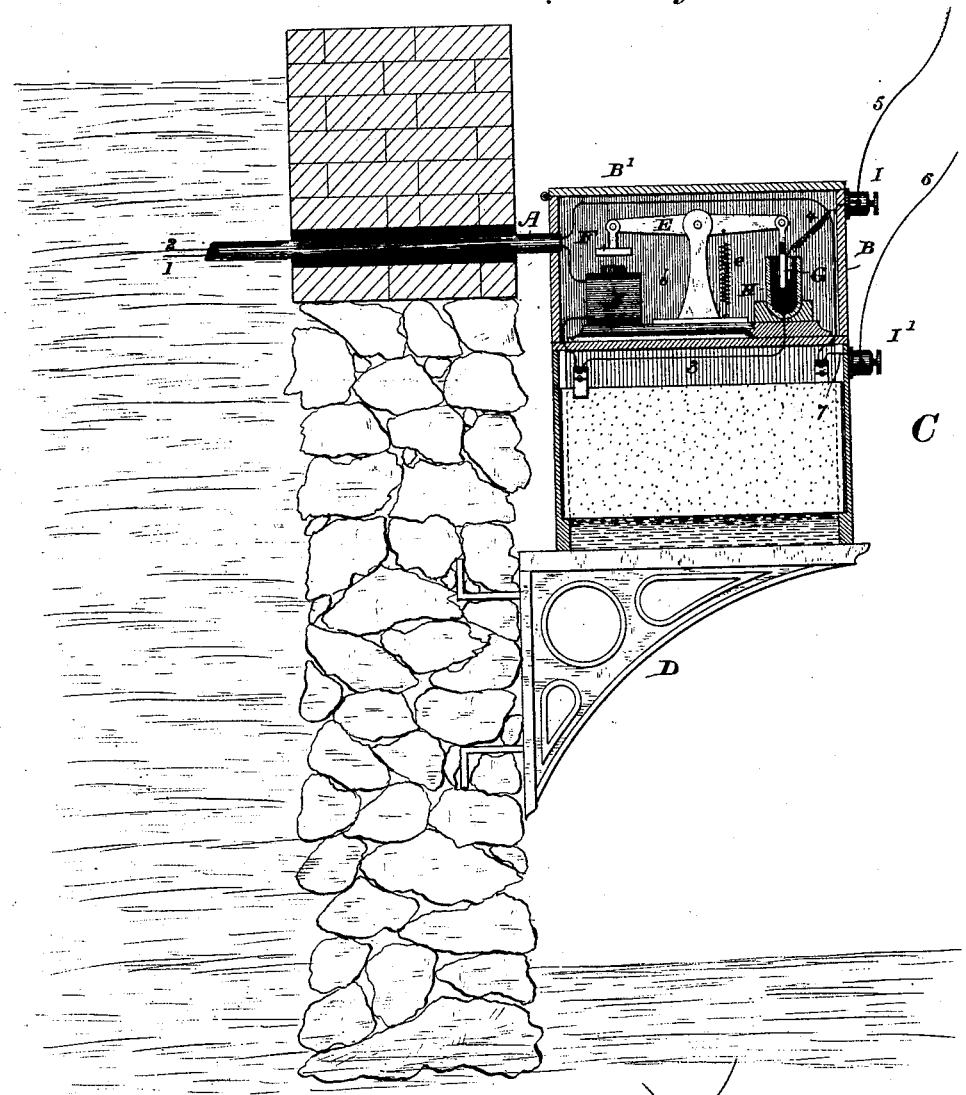

(No Model.)

E. T. STARR.
CHARGING AND DISCHARGING SECONDARY BATTERIES.

No. 359,900. Patented Mar. 22, 1887.

WITNESSES:
Wm A. Skinkle
Geo W Young

INVENTOR:
Eli T. Starr,
By his Attorney
Wm J. Peyton.

UNITED STATES PATENT OFFICE.

ELI T. STARR, OF PHILADELPHIA, PA., ASSIGNOR, BY MESNE ASSIGNMENTS, TO THE ELECTRICAL ACCUMULATOR COMPANY, OF NEW YORK.

CHARGING AND DISCHARGING SECONDARY BATTERIES.

SPECIFICATION forming part of Letters Patent No. 359,900, dated March 22, 1887.

Application filed November 23, 1882. Serial No. 77,495. (No model.)

*To all whom it may concern:*

Be it known that I, ELI T. STARR, of the city and county of Philadelphia, in the State of Pennsylvania, have invented certain new and useful Improvements in Charging and Discharging Secondary Batteries, of which the following is a specification.

My invention relates to certain improvements in charging and discharging secondary batteries.

The objects of my improvements more especially are, first, to break the working-circuit of the battery at the time of charging it for the purposes of safety, and also so that surreptitious or unauthorized use of the charging-current cannot be made by including in said working-circuit other batteries or apparatus to be acted upon by the charging-current; secondly, to automatically break the working-circuit of the battery while being charged by the energy of the charging-current.

The subject-matter claimed is first fully described and then particularly recited at the close of the specification.

In the accompanying drawings I have shown my improvement as organized in the best way now known to me.

Some of my improvements may be used without the others, and in ways differing from that shown.

My improvements are particularly applicable to the system of electric lighting and power-distribution by means of secondary batteries invented jointly by myself and William J. Peyton, of Washington, District of Columbia, and patented to us July 4, 1882, as No. 260,624, and July 18, 1882, as No. 261,490, and to improvements of that system invented by me, for which sundry applications for Letters Patent are now on file in the United States Patent Office. In said system, and improvements thereon, we have arranged batteries along a main or charging line, to be charged from a central station at suitable periods and then cut out to constitute effective sources of electric supply to run, for instance, electric lamps, included in the working-circuits of said batteries, and arranged throughout the houses or places at which said batteries may be located. It is intended in some instances that the batteries of each house shall be located in the cellar thereof, and the wires constituting the working-circuit of the battery or set of batteries be run throughout the house to include the apparatus to be worked.

In order to prevent the main or charging current, when charging the batteries, from being surreptitiously used to operate other apparatus or charge other batteries—or, in other words, to confine the energy of the charging-current to its proper and intended use and prevent it from being stolen from the wires by tapping or connections made by the resident of the house or other unauthorized person—I have devised the present improvements, and I will now describe the best way now known to me of carrying them into effect, first premising that any effective and suitable form of battery or batteries may be used, the invention not being confined to any particular form or construction thereof.

The main or charging current is shown in this example as conducted to the battery by means of a complete metallic underground-circuit, the wires 1 2 thereof being incased in a suitable tube, pipe, or covering, A, which is extended so as to be connected with the battery box or vessel B, as clearly shown in Fig. 1, whereby unauthorized connection with or tapping of the main or charging line is prevented up to the point of reaching the battery C. The battery may be mounted on a bracket, D, attached to the wall of the cellar, for example; and in this case a plain metal pipe, A, extending into the battery-vessel, may be used to incase the wires 1 2.

Mounted in an upper chamber, *b*, of the battery box or vessel B is a base-board carrying a centrally-pivoted beam or lever, E, at one end of which is an armature, F, and at the opposite end is an insulated contact-point or connection, G, consisting, in this instance, of a conducting metal rod dipping into mercury or other conducting-fluid contained in an insulating-cup, H, when the beam E is in its normal position, as maintained by a light spring, e. The mercury in the cup H is electrically connected with one pole of the battery by means of a wire, 3, and to one of the binding-posts, I, with which one of the working-circuit wires 5 is connected, by means of the conducting-rod G and wire 4, so that, it will be seen, when the beam E is in its normal position the wire 3, conducting-liquid, contact-rod G, and wire 4 constitute part of the working-circuit of the battery. A wire, 6, leading from the binding-post I', constitutes, in connection with the wire 5 and internal battery-connections before described, the working-circuit of the battery, the binding-post I' being electrically connected by wire 7 with the pole of the battery opposite that to which the binding-post I is connected, and the wires 5 and 6 being joined at some point in the house, for example.

Opposed to the armature F of the beam E is an electro-magnet, J, which is included in the main or charging circuit, (or in a branch thereof, if preferred, in well-known ways not necessary to be shown,) the main wire 1, after leaving said magnet, passing to and being connected with one pole of the battery, (the positive, for instance,) while the wire 2 is run to the opposite (or negative) pole, thus completing the charging-circuit (by the electrolytic fluid of the battery) through the battery. When, now, the charging-generator is throwing current over the charging-line, the magnet J will be excited, and will attract the armature F and draw down the end of the lever E, to which said armature is connected, thereby breaking the working-circuit of the battery by withdrawing the rod G from the conducting-liquid, or by raising said rod in the liquid to such an extent as to practically amount to the same thing. The charging operation is continued for the requisite time, during which, it will be obvious, no theft or unauthorized use of the charging-current can take place, as the working-circuit will be broken, while the main wires to the battery are so incased that if tampered with exposure will follow.

As soon as the charging-current is cut off the magnet is no longer excited, its armature is released, the spring draws down the beam, and the working-circuit is closed to permit the energy of the charged battery to be utilized at the desired time over the working-circuit.

The breaking of the working-circuit while charging is not only desirable for the prevention of fraudulent abstraction of current, but is also highly useful to avoid all danger due to the possible passage of currents of high tension through the house (or working circuit) wires if not thus provided against.

Figure 2:

In Fig. 2 I have shown one of the plates or elements of one of the well-known forms of secondary battery as provided with a convenient clamp-connection for the connection of the wires.

The operative parts of the mechanism for automatically breaking the working-circuit while charging is preferably inclosed in the upper chamber of the battery-vessel, which is provided with a hinged lid, B', which is locked by a suitable lock, the key of which is retained by the proper person.

It will be understood, of course, that any suitable make-and-break contact may be substituted for the liquid arrangement shown, and that other changes may be made, some of which will readily suggest themselves to skillful electricians.

I claim as my invention—

1. In a system for distributing electricity by means of secondary batteries, the combination, substantially as hereinbefore set forth, of a closed battery-vessel containing the electrodes of the battery, covered or protected conductors for the charging-current leading to said electrodes, and inclosed mechanism whereby the working-circuit of the battery is broken during the time of charging, for safety and for the prevention of unauthorized use of the charging-current.

2. The combination of a secondary battery, a working-circuit therefor including a circuit-breaker located in the battery-vessel, a main charging-circuit including said battery, and an electro-magnet in said battery-vessel included in the main charging-circuit, and adapted to operate said circuit-breaker to disconnect the working-circuit during the charging of the battery, substantially as described.

3. The combination of the secondary battery, the vessel therefor having two compartments, in one of which are the electrodes and battery-fluid, a circuit-breaking lever in the second compartment, a working-circuit for the battery including a contact operated by said lever, the main charging-circuit, an electro-magnet therein inclosed in said vessel and placed opposite one end of said lever, and an armature carried by said lever, whereby the working-circuit is broken when said magnet is energized, substantially as described.

4. The combination of the charging-circuit, the electro-magnet included therein, the secondary battery, the working-circuit of said battery, and the pivoted lever carrying at one end an armature opposite said magnet and at the other end a conducting-connection forming part of the working-circuit and movable in a liquid-containing cup, the liquid of which also constitutes part of the working-circuit, substantially as described.

In testimony whereof I have hereunto subscribed my name this 21st day of November, A. D. 1882.

ELI T. STARR.

Witnesses:
 WM. J. PEYTON,
 ALBERT P. ROOT.